Feb. 6, 1951  W. W. WAGNER, JR., ET AL  2,540,971
SHEET STACKING AND CONVEYING MACHINE
Filed May 3, 1946  9 Sheets-Sheet 1
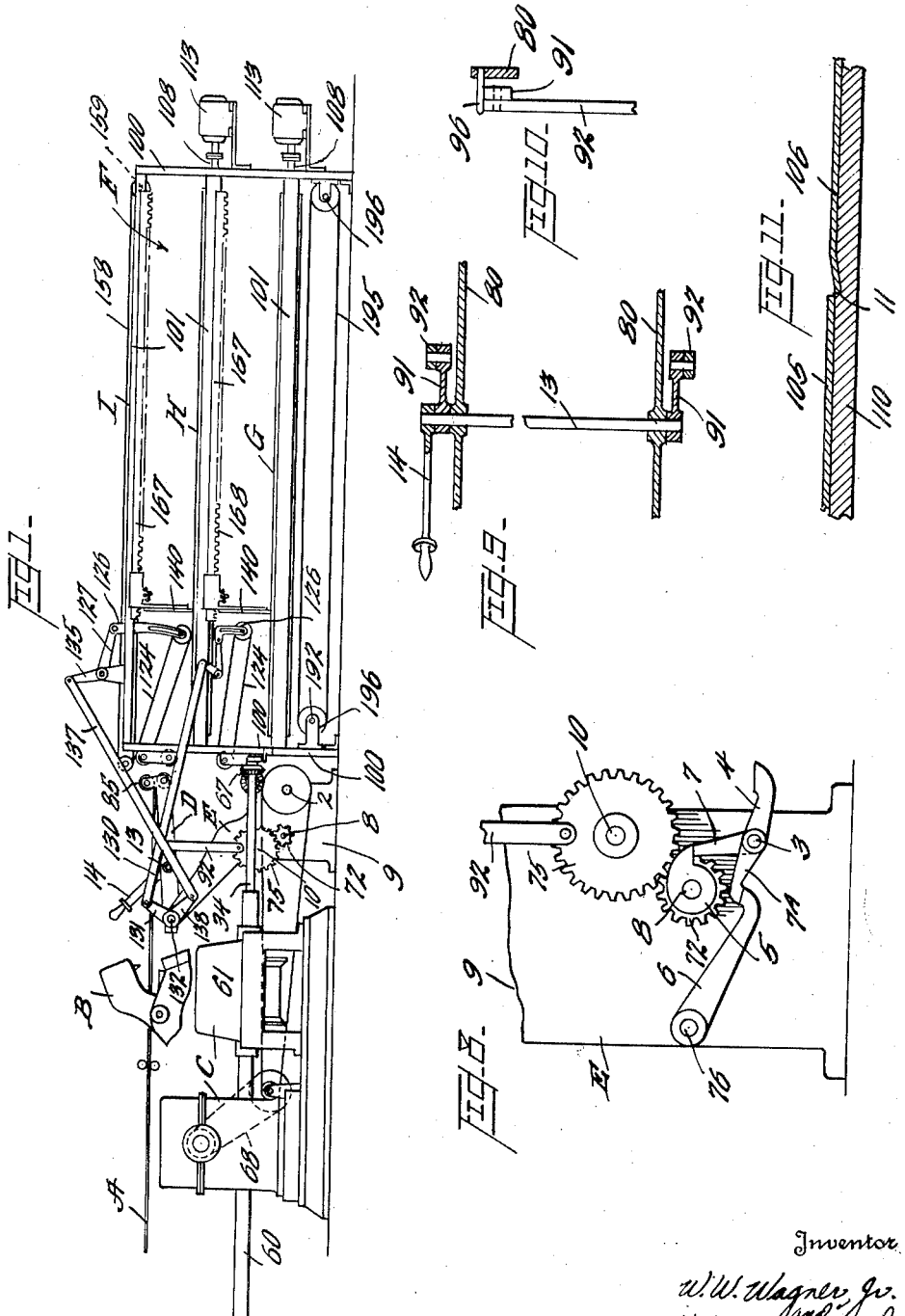
Inventor
W. W. Wagner, Jr.
and
H. B. Greenwood
By Watson, Cole, Grindle & Watson
Attorney

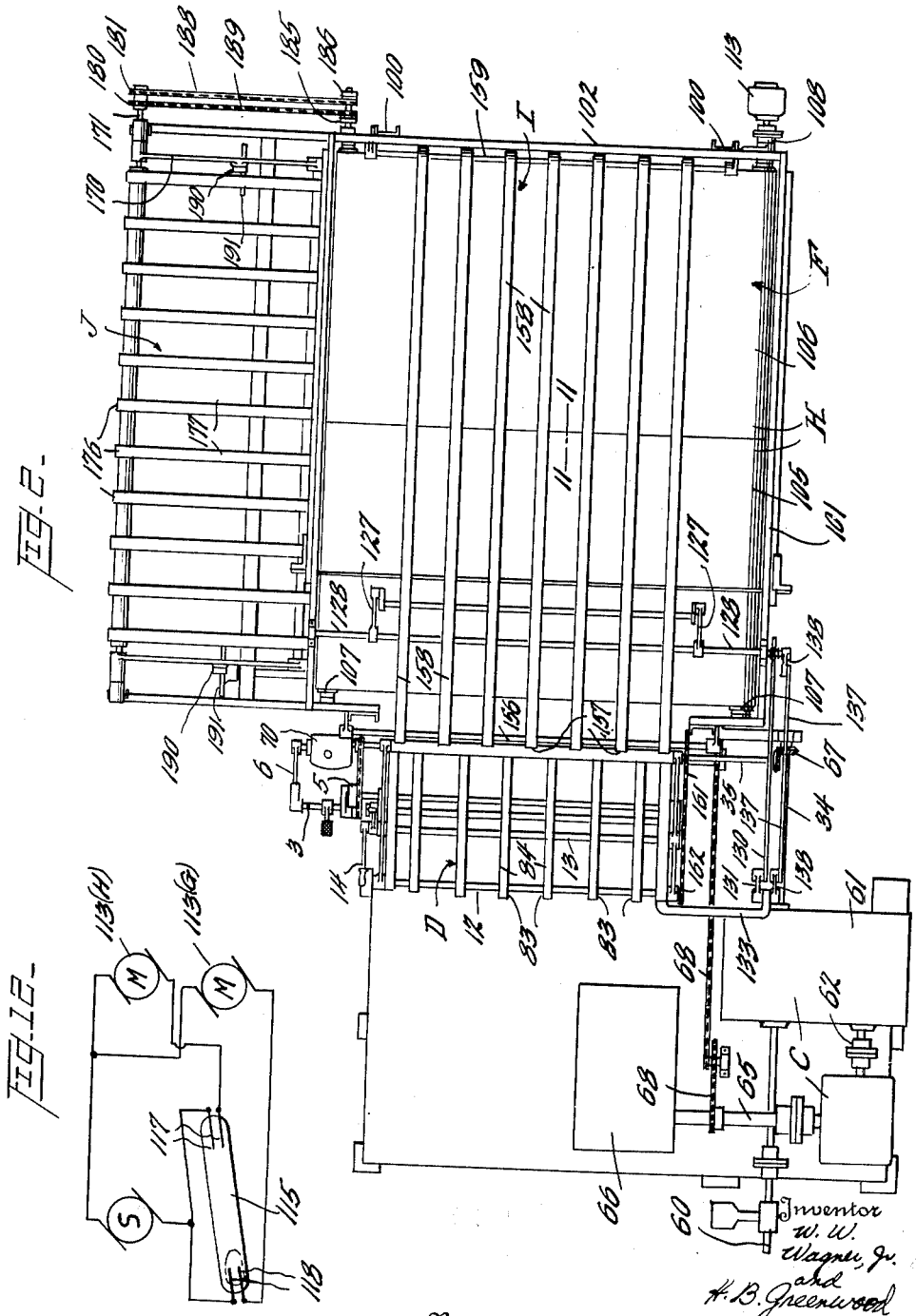

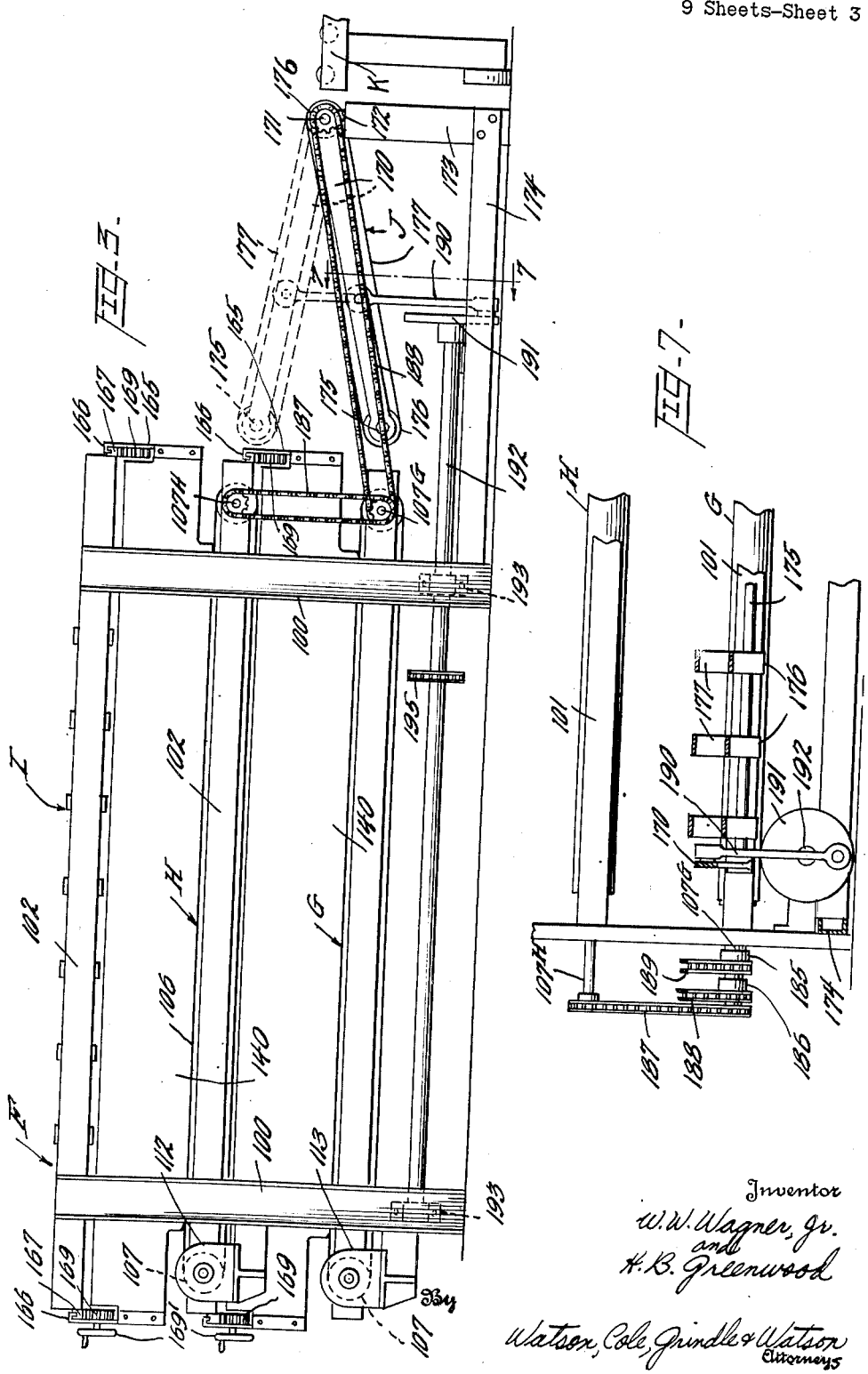

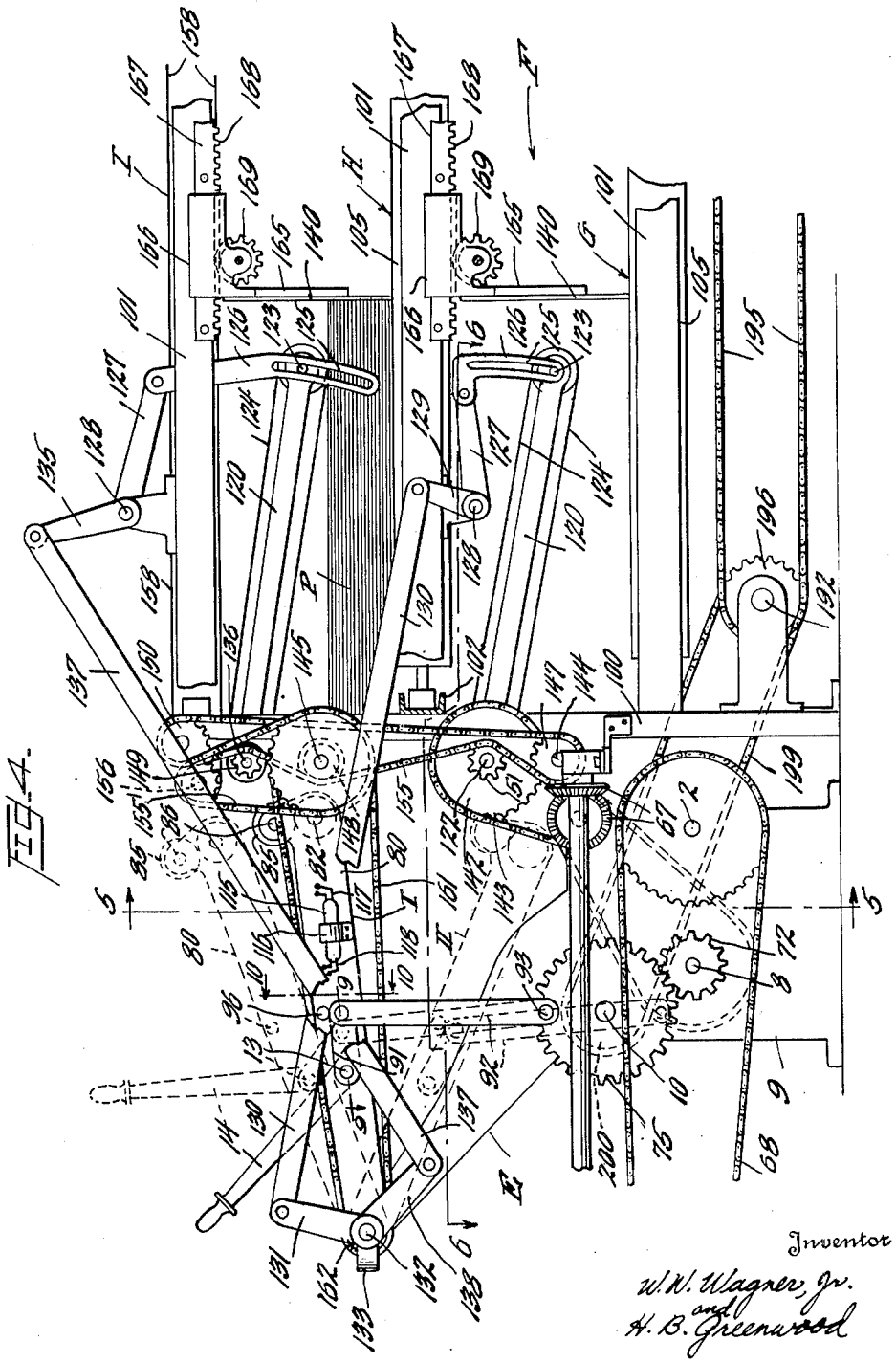

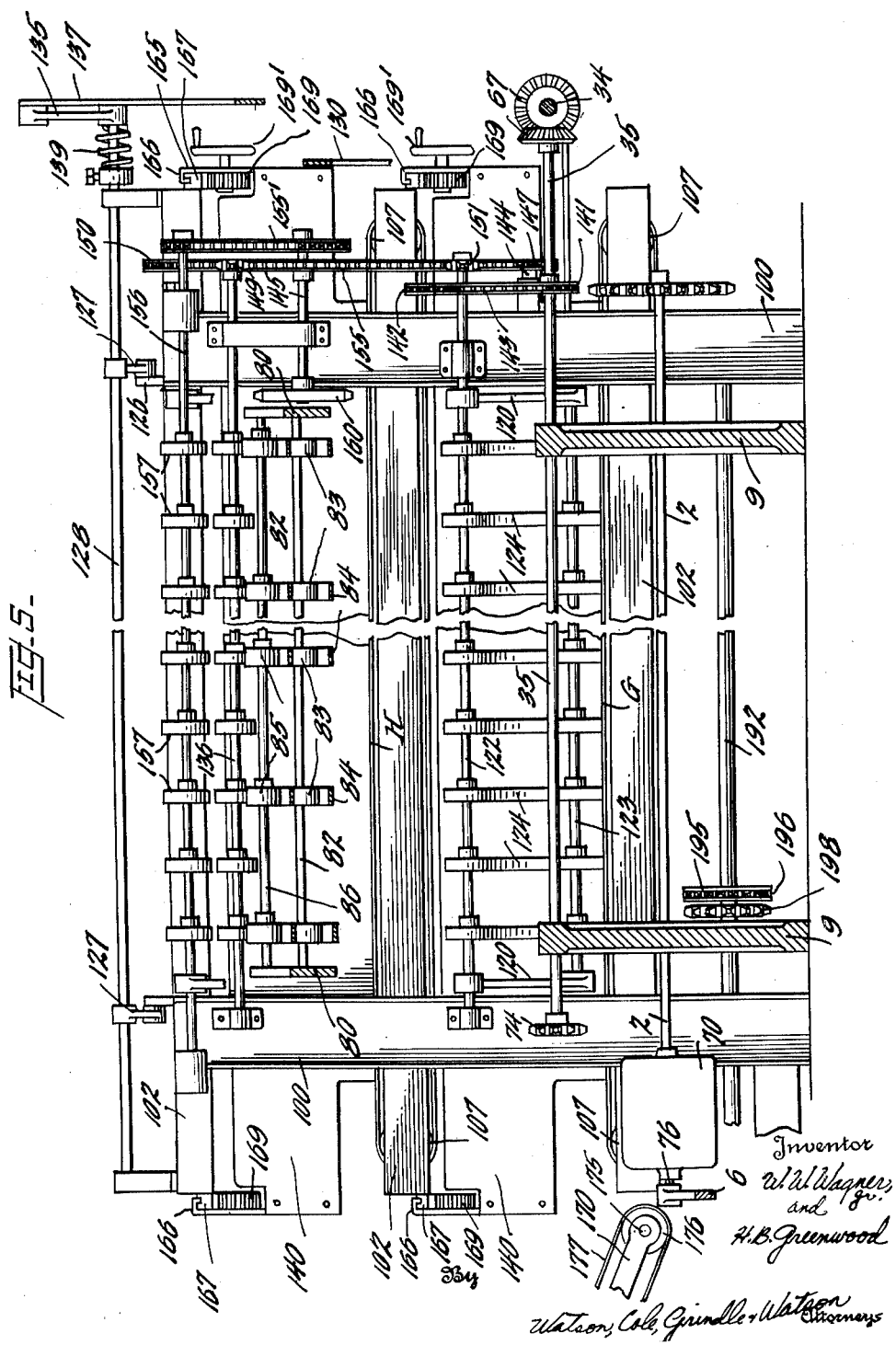

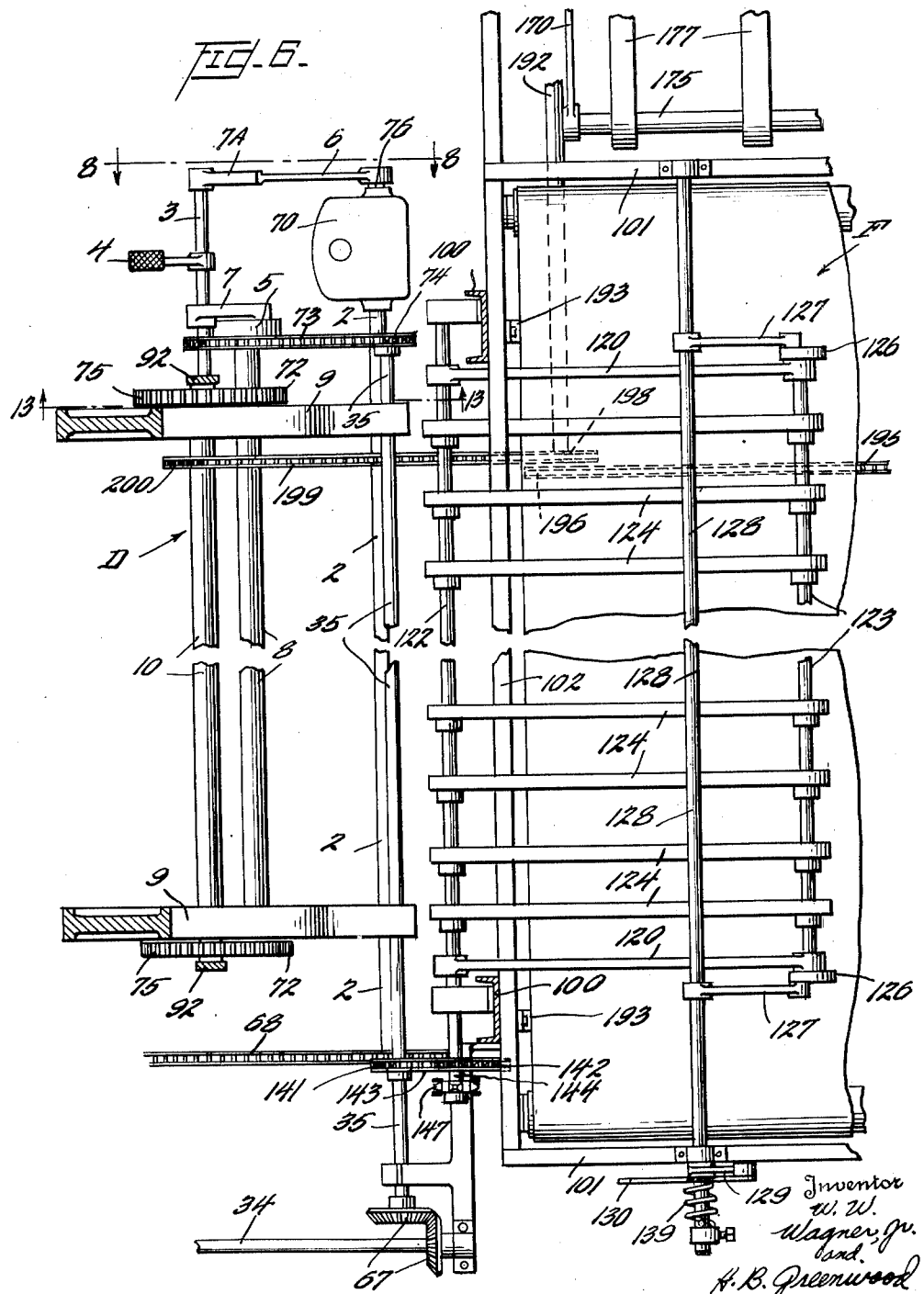

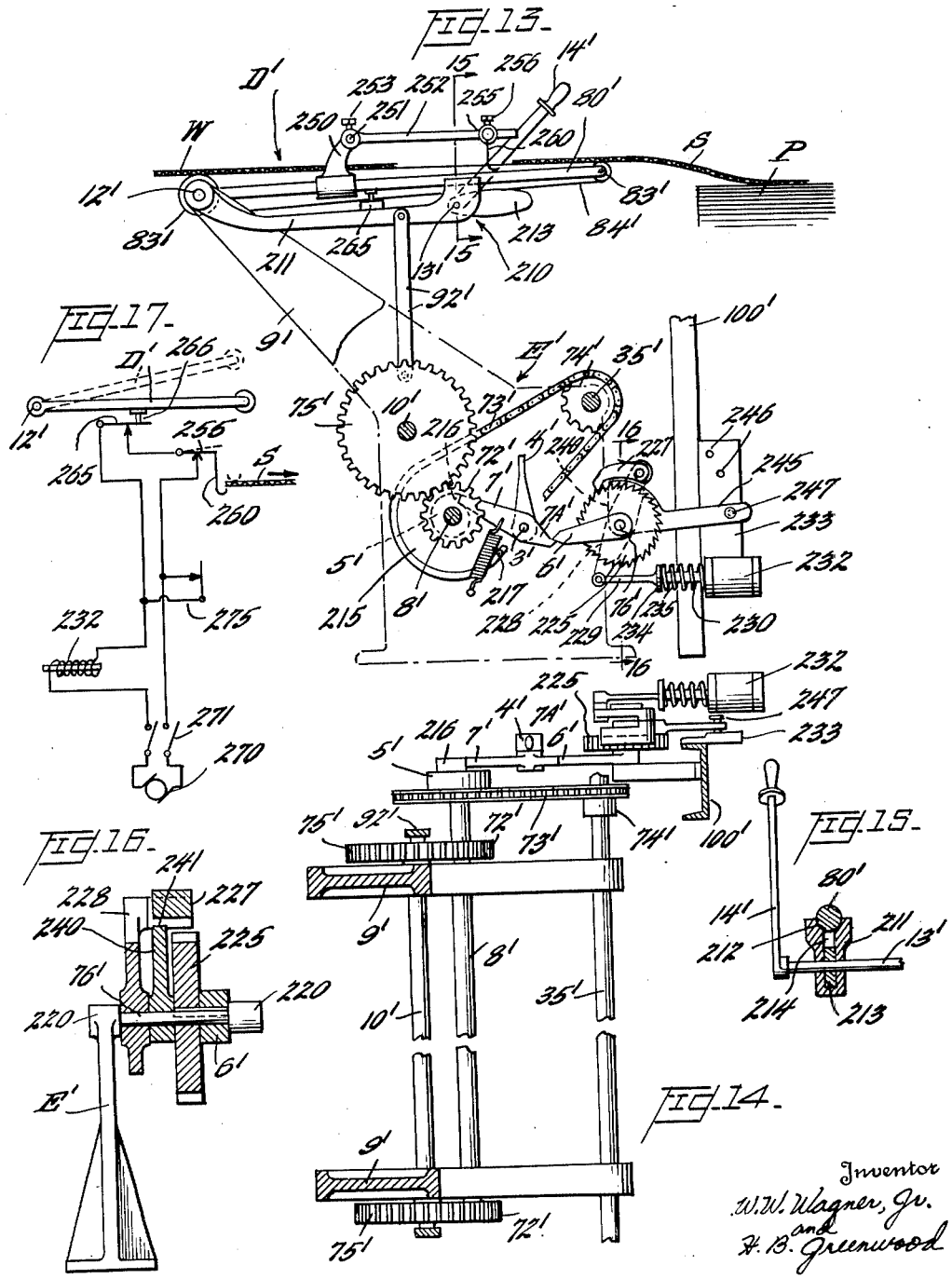

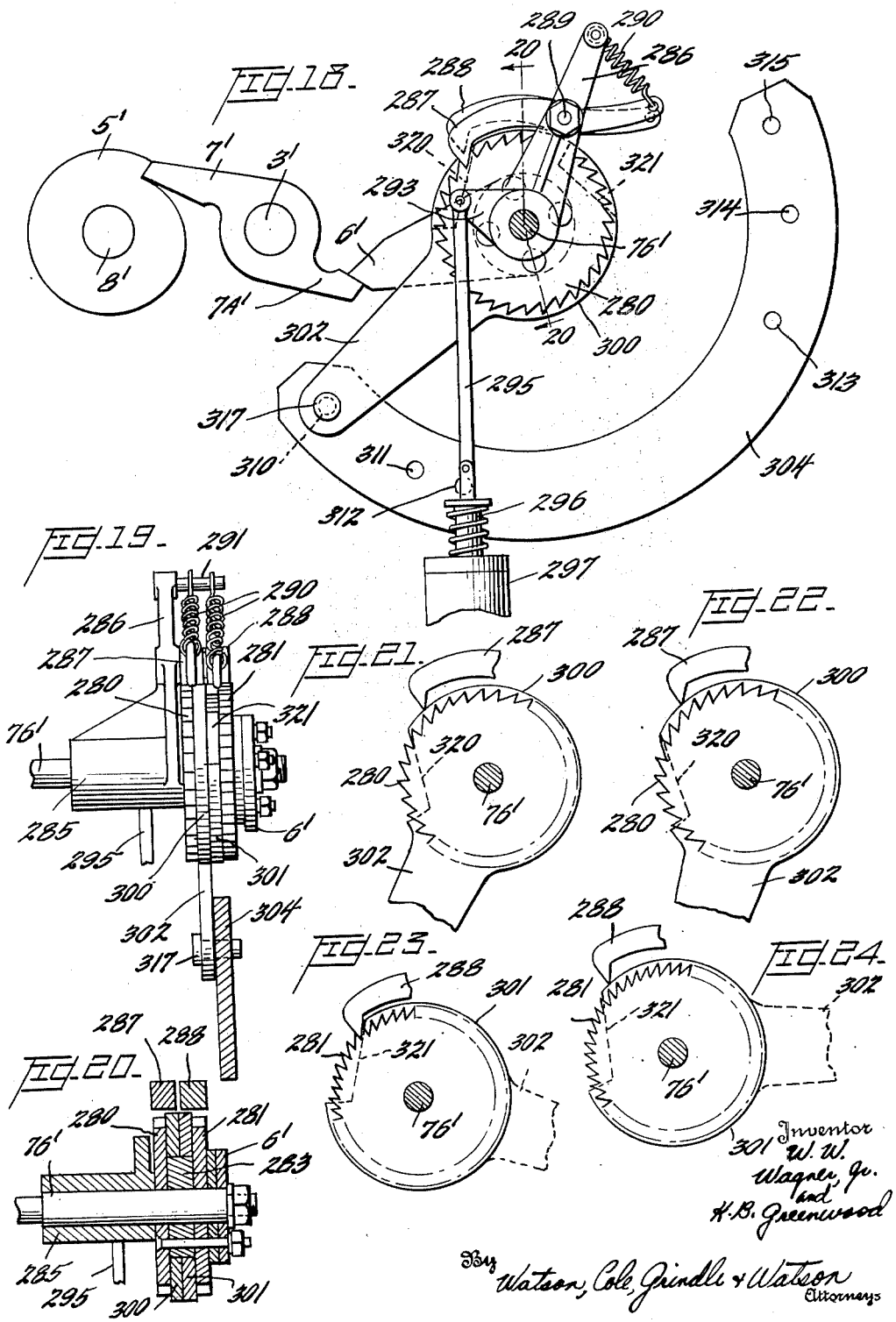

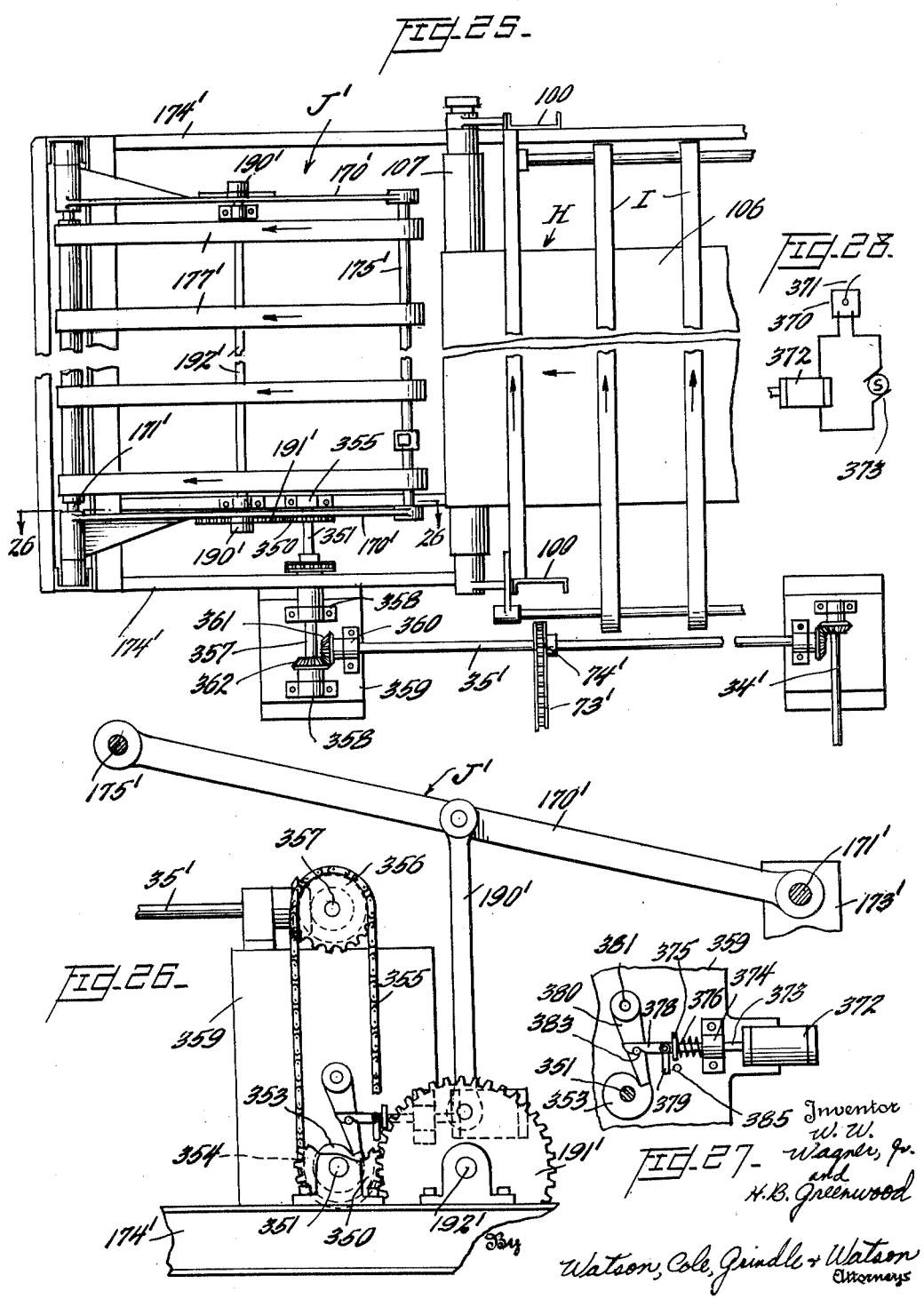

Patented Feb. 6, 1951

2,540,971

UNITED STATES PATENT OFFICE 2,540,971

SHEET STACKING AND CONVEYING MACHINE

Wilmer W. Wagner, Jr., and Henry B. Greenwood, Baltimore, Md., assignors, by mesne assignments, to Samuel M. Langston Co., Camden, N. J., a corporation of New Jersey Application May 3, 1946, Serial No. 667,180

38 Claims. (Cl. 93—93)

This invention relates to conveyors and more particularly to conveyors for transporting and stacking sheet material and to manual and automatic controlling means for such conveyors.

The general object of the invention is to provide a novel and improved machine which is adapted to receive successive sheets of material, stack them in piles of predetermined height, and deliver the piles to a desired destination for storage, shipment, or use.

Another object of the invention is the provision of a machine of the class described which is mainly automatic in operation, which is provided with adjustable means for regulating the number of units to be placed in each pile, and which is adapted for handling sheets of various sizes.

The present invention is particularly applicable to the receiving and stacking of severed sheets of corrugated board from a corrugating machine. The conventional machine for making corrugated paper board includes shears and slitter knives for cutting the freshly fabricated board into sheets of various predetermined sizes in accordance with the demands of the consumers.

The corrugating machine operates at a very rapid rate and, while attempts have heretofore been made to provide high-speed automatic machines for handling and delivering the subdivided sections of the paper board as they come from the severing knives, no satisfactory practical machine for this purpose has been devised prior to the present conception.

In its preferred embodiment, the invention contemplates the provision of a conveying and stacking machine which is almost completely automatic in operation, and which is arranged to receive the severed units, stack a specified number of them in a pile, and transfer the completed pile toward the delivery end of the machine. Two or more piling areas or zones are provided which are used in alternation, the sheets being received and stacked at one of such zones, while one or more previously completed piles are being removed from another of such stacking zones. Automatic means are provided for shifting the delivery of units from one of the stacking points to the other in accordance with the number of sheets wanted in a stack, and the rate of delivery of the piles from the machine is synchronized with the rate of operation of the corrugator. Means are also provided for throwing out defective sheets before they can be forwarded to the pile being formed.

The automatic means for operating the stacker and delivery devices in accordance with the number of sheets in a pile, include both mechanical and electrical embodiments.

Other objects and features of novelty will be apparent from the following specification when read in connection with the accompanying drawings in which certain embodiments of the invention are illustrated by way of example.

In the drawings,

Figure 1 is a somewhat diagrammatic view in side elevation of a machine embodying the principles of the invention;

Figure 2 is a plan view of the machine;

Figure 3 is a view in end elevation of the machine showing the stack delivery conveyor mechanism;

Figure 4 is a fragmentary view in side elevation of an intermediate portion of the machine;

Figure 5 is a transverse vertical sectional view taken on line 5—5 of Figure 4;

Figure 6 is a view in horizontal section taken on line 6—6 of Figure 4;

Figure 7 is a fragmentary transverse vertical sectional view of the stack delivery portion of the machine, taken on line 7—7 of Figure 3;

Figure 8 is a fragmentary view in elevation of a portion of the machine showing certain of the controls, as seen from line 8—8 in Figure 6 looking in the direction of the arrows;

Figure 9 is a fragmentary substantially horizontal sectional view taken on line 9—9 of Figure 4;

Figure 10 is a fragmentary view in vertical section taken on line 10—10 of Figure 4;

Figure 11 is a fragmentary vertical sectional view through the laterally movable stack moving conveyors taken substantially on line 11—11 of Figure 2;

Figure 12 is a wiring diagram for the stack conveyor motion;

Figure 13 is a fragmentary view in vertical section as if taken on line 13—13 of Figure 6 of the first illustrated embodiment, but showing an adaptation for electrical counting of the sheets and control of the stack size;

Figure 14 is a plan view of the portion of the machine shown in Figure 13;

Figure 15 is a fragmentary vertical sectional view taken on line 15—15 of Figure 13;

Figure 16 is a similar view taken on line 16—16 of Figure 13;

Figure 17 is a wiring diagram applicable to the embodiment illustrated in Figures 13—16 inclusive;

Figure 18 is a fragmentary and somewhat diagrammatic view of an alternative embodiment of the timing means for determining the stack sizes, and which is capable of a wider range of adjustment than the one shown in Figures 13 and 14;

Figure 19 is a fragmentary view in elevation as seen from the right hand end of Figure 18;

Figure 20 is a fragmentary view in vertical section on line 20—20 of Figure 18;

Figures 21, 22, 23, and 24 are fragmentary, diagrammatic sectional views of the pawl and ratchet members in various adjusted positions of control;

Figure 25 is a plan view of the delivery end of the machine showing an electrical control therefor;

Figure 26 is a vertical sectional view taken on line 26—26 of Figure 25;

Figure 27 is a fragmentary view in elevation of a detail of the solenoid actuated latch associated with the embodiment shown in Figures 25 and 26; and Figure 28 is a wiring diagram showing the sheet actuated circuit featured in this latter form of the invention.

Referring more particularly to Figures 1, 2 and 3 of the drawings, the principal parts of the novel stacking machine will be described in a general way and the correlated functions thereof set forth. The continuous web of corrugated board or similar sheet material, as it comes from a fabricating machine, is indicated at A in Figure 1. The web passes through a flying shear, shown diagrammatically at B, by which it is cut into predetermined lengths. Certain driving mechanism for the shear and for some of the associated conveyors is indicated generally at C. The successive sheets severed by the shear and the conventional type of longitudinal slitting device which may be employed, are dropped upon the intermittently shiftable distributing conveyor D.

The distributor D is supported by a frame E which also serves to support some of the driving and transmission mechanisms which will be later described. The stacker proper is indicated generally by reference character F and comprises essentially three belt conveyors G, H, and I. The conveyors G and H comprise alternately usable stacking areas which receive a predetermined number of sheets from the distributing conveyor D, the operation of the latter being timed so as to drop the desired number of sheets upon the conveyor G and then to be automatically raised to drop a number of sheets upon the conveyor H to form another pile or stack. While sheets are being furnished the stack conveyor H by the distributor D, as indicated by the positions of the parts in Figure 1 of the drawings, the conveyor H is idle, while the conveyor G is being operated to move in a direction transverse to that of the movement of the web A and the sheets being distributed by the conveyor D. On the other hand, when the distributor conveyor apron D is lowered to deliver sheets upon the cross conveyor G, the movement of this conveyor is halted, and the conveyor H is actuated to move the completed stack transversely of the stacking unit F to be continued to a point of delivery.

The distributing conveyor D is susceptible of manual operation to raise it to a still higher point than the position shown in Figure 1 so as to deliver certain sheets, for example defective ones, upon an upper tape conveyor I which moves longitudinally of the machine as shown in Figure 1 and is adapted to deliver such sheets off of the right-hand end of the machine F, preferably into a suitable receptacle not shown.

As most clearly seen in Figures 2 and 3 of the drawings, the stacks are alternately delivered from the conveyors G and H onto the alternately shiftable delivery conveyor J, from whence they are transferred to the roller table K for final handling. As clearly indicated in Figure 3, the delivery conveyor J is a belt conveyor pivoted at the remote end for alternate adjustment to receive the stacks from the stack conveyors G and H, the position shown in solid lines being appropriate to receive stacks from the lower conveyor G, and the dotted line position shown adjacent the upper conveyor H.

Means are provided for alternately shifting the distributor D from one stacking area to the other in accordance with the number of sheets to be placed in a given pile, and at the same time to alternately actuate and stop the conveyors G and H, and to shift the delivery conveyor J to a position to receive the completed stack from the stack conveyors G and H at the time that they are respectively in operation. The details of construction and operation of these various elements of the novel machine, together with the power transmission and controls, will now be described, in connection with both the mechanically controlled and the electrically controlled embodiments.

The mechanically controlled machine is illustrated in Figures 1–12 inclusive, and it is to these portions of the drawings that attention will be directed first.

The main drive shaft for the stacker is indicated at 60 and is preferably driven in synchronism with the driving means for the fabricating or sheet feeding machine with which the stacker is associated, so that the flying shear B and the stacking devices may be adjusted to the speed of operation of such preliminary machines. The drive shaft 60 enters the gear box 61 which may contain a Reeves change speed gear through which may be driven the shaft 62 which through the gear box 63 actuates the shaft 65 which through suitable transmission, indicated diagrammatically at 66, will drive the shear B.

The main drive shaft 60 extends through the gear box 61, and the extension thereof toward the stacking machine is designated 34. A transverse shaft 35 is driven by the shaft 34 through the bevel gears 67, and this shaft 35 extends across the machine and finds its bearing in the side frames 9 of the unit E. Paralleling the cross shaft 35 is another transverse shaft 2 which is driven by means of the chains 68 from the shaft 65, the latter having a 1:1 ratio with the knife of the shear B. The remote end of the shaft 2 enters the change speed gear box 70. The change speed gearing 70 may be set in different ratios, for example 1:1, 2:1, 3:1, 4:1, etc. The adjustment in the illustrated embodiment is such that with a 1:1 ratio eight sheets are delivered upon a single pile, with a 2:1 ratio sixteen sheets are delivered, and so on in direct proportion to the gear change.

Cross shafts 8 and 10 are rotatably mounted in the side frames 9 and are connected for proportionate rotation by means of the gearing 72, 75. An extension on the shaft 8 carries a single revolution trip clutch 5 the input element of which comprises a sprocket driven by the chain 73 from a sprocket 74 carried upon the end of the shaft 35.

A driven shaft 76 extends from the gear box 70 and constitutes the output shaft of this variable speed transmission which is driven at the ratios above described. Upon the stub shaft 76 there is fixed a rotating trip arm 6. Suitably carried by the supporting frame 9 is a short rock shaft 3 upon which are keyed the crank arm 7A, the foot treadle 4 and the clutch tripping lever 7. These parts are shown in Figures 6 and 8 of the drawings, and from the description and illustration, it will be readily apparent that while the power shafts 2 and 35 are rotated continually, the actuating force is transmitted to the shafts 8 and 10 only intermittently, each cycle effecting a single revolution of the shaft 8, the period between actuations being determined by the setting of the gearing 70. The gearing 72, 75 is at a 1:2 ratio and this means that the shaft 10 makes but one revolution for each two revolutions of the shaft 8.

The distributing conveyor D comprises a pivoted framework including the side frames 80 which are freely mounted at one end upon the rotatable cross shaft 12 which has bearings in the side frames 9 of the support E. A rotatable shaft 82 is carried by the swinging end of the frame 80 and upon the shafts 12 and 82 are mounted pulleys or rollers 83 upon which the tapes or belts 84 are trained. A series of pressure rollers 85 are mounted on a cross shaft 86 and are adapted to bear upon the sheets which are carried by the tapes 84. The shaft 12 and consequently the rollers and tapes are driven at a constant speed through transmission mechanism which will be later described.

The side frames 80 of the conveyor D are provided with a rockable transverse shaft 13 upon each end of which is keyed a crank 91 which together with a link 92 forms a toggle arrangement the purpose of which will be described. The lower end of the links 92 are pivoted upon the pins 93 carried by the rotatable gears 75 which are keyed to the drive shaft 10, and are driven by the gears 72 on the shaft 8. The pins or studs 96 carried by the side frames 80 serve as stop elements for the toggle 91, 92 and normally provide that the link 92 is the actuating pitman which causes the conveyor D to raise and lower by the crank action of the gear 75. A hand lever 14 keyed to the cross shaft 13 may be used to extend the toggle when the conveyor is in its upper normal position (shown in solid lines in Figure 4) so as to raise the conveyor still higher to the position indicated in the broken lines in Figure 4 where the sheets may be delivered to the discarding conveyor I. Bearing in mind that the shaft 35 is rotated at a constant rate proportional to the speed of the main drive, and that shaft 2 is driven at a speed equal to that of the shear drive, it will be readily understood that after a given number of revolutions of shaft 2 (and therefore after a corresponding predetermined number of sheets have been severed and fed by the distributing conveyor D, the single revolution clutch 5 is tripped so that shaft 8 makes a complete revolution and shaft 10 makes a half revolution, and the latter through the pitman 92 causes the conveyor D to move to or from one of its positions indicated by the numerals I and II in Figure 4.

The stacker section F of the machine comprises a supporting framework comprising the channel posts 100 adjacent the corners thereof, and the horizontal framing which comprises the longitudinal horizontal beams 101 and the cross beams 102. The transverse, stack-carrying, alternately operable, belt conveyors G and H comprise pairs of wide endless belts 105 and 106 which are passed around the rollers 107 which are carried on shafts journalled in certain of the cross frame members 102. Between the parallel runs of the belts 105 and 106 which comprise the conveyors G and H, suporting plates 110 are disposed and secured by suitable brackets or other suitable fastening devices to the cross members 102. These supporting members or plates are preferably notched at their central portions adjacent the line of contact of the belts 105, 106 as clearly indicated in Figure 11 at 112. This is for the purpose of permitting sheets being stacked to move readily from the belt 105 onto the belt 106 without tripping and buckling. Chain driven rollers may be substituted for the belts 105, 106.

The shafts 108 which carry the rollers 107 at one edge of the stacker F are driven by the gear motors 113. These motors are alternately actuated to drive the proper stack conveyors G and H depending upon the operative position of the distributor conveyor D. Upon one of the side frames 80 of the conveyor D there is secured a mercury switch 115 secured thereto by means of a bracket 116. In each end of the mercury switch 115 there are pairs of contacts which when closed serve to actuate the respective motors. The contacts 117 at the right-hand end of the switch are in the energizing circuit of the upper motor 113 which drives the conveyor H and the pair of contacts 118 at the left-hand end of the switch and in circuit with the lower motor 113 which drives the conveyor G. Thus when the distributor conveyor D is in its upper regular position as shown at I in Figure 4 the mercury in the switch 115 will close the contacts 118 and energize the conveyor G which will thus deliver a previously formed stack while the current stack is being made up on the upper conveyor H. Then when the stack on the conveyor H is completed, the distributor D will drop to the position indicated at II and the contacts 118 of the switch will be broken and contacts 117 closed thus energizing the motor 113 which drives the conveyor H, and stopping the motor which controls the conveyor G, while a stack is being made upon the latter conveyor. The motor control circuits are indicated very clearly in Figure 12 of the drawings.

Certain presser belts are employed for guiding the sheets to the piles or stacks being formed on the respective conveyors G and H, and for urging the sheets against the back stops to prevent rebound, and these presser devices comprise framing consisting of the parallel bars 120 which are pivotally mounted upon the rotatable shafts 122 and 136 respectively. The opposite ends of the bars 120 are adapted to rotatably receive the shaft 123 which carries rollers similar to those provided upon the shaft 122 about which the presser belts 124 are trained. The ends of the shaft 123 are projected into slots 125 formed in the depending brackets 126 which brackets are supported by the crank arms 127 fixed respectively to the shafts 128 which are pivotally mounted one above the other on the main frame F. Thus far, the two presser frames for the conveyors G and H are substantially identical in construction. However, somewhat different arrangements are provided for adjusting these presser frames and these operative devices will now be described. In connection with the lower presser frame, there is fixed to the lower shaft 128 an arm 129 pivoted to the long link 130 which extends rearwardly to a crank arm 131 one end of which is fixed rigidly to a stub shaft or pin 132 which is in turn rigidly carried by the rocking bracket extension 133. The extending bracket 133 is rigidly fixed to the frame 80 of the swinging distributing conveyor D and is adapted to rock with the movements of this frame.

The upper presser arrangement associated with the conveyor H includes an arm 135 which is fixedly secured to the shaft 128 at the upper portion of the machine, and this arm 135 is connected by means of the elongated link 137 which is attached to the crank 138, the latter also being fixed with respect to the rocking pin 132 and bracket 133.

From the above, it will be understood that when the distributor conveyor D is in the position I shown in Figure 4, in which it is delivering sheets S to the pile P being formed on the conveyor H, the upper presser arrangement is in lowered position, whereby the presser tapes 124 press upon the pile P; and through the movement of the tapes the sheets are guided into position on the pile until they abut the back stop 140. At the same time, the lower presser frame is in raised idle position.

In order to permit the shifting of the conveyor D to discard position without unduly displacing the presser devices in either direction, resilient lost-motion connections may be interposed in the activating linkages, as for example the spring connections 139 between the rock shafts 128 and the arms 129 and 135 respectively.

The driving means for the belt conveyor D and the presser devices 120 will now be described, with special reference to Figure 4 of the drawings. Suitably mounted on appropriately arranged brackets carried by the forward frame posts 100 of the stacker F, are the transverse shafts carrying sprocket wheels about which are trained drive chains and by means of which the driving force is transmitted from the drive shaft 35 to the various conveying and pressing instrumentalities. A chain 143 connects a sprocket 141 on shaft 35 with a somewhat larger sprocket 142 on the transverse shaft 122 which drives the lower presser belts. Transverse shafts 144 and 145 carry sheet guiding rollers which aid in the transferring of the sheets from the distributor conveyor D to the conveyors G and H respectively and these shafts are provided with sprocket wheels 147 and 148. The upper presser belt driving shaft 136 is also provided with a sprocket 149 and there is disposed at the extreme upper end of the receiving portion of the device an idler sprocket 150. A similar sprocket 151 is also provided on the shaft 122. A chain 155 connects all of these sprockets 147, 148, 149, 150, and 151 so that, as viewed in Figure 4, the sprockets 147, 148, and 150 rotate in a clockwise direction, while sprockets 151 and 149 rotate in a counter-clockwise direction. This causes the feed-in shafts 144 and 145 to rotate in the proper direction to forward the sheets to the respective piles, and causes the shafts 122 and 136 to rotate in the proper direction to cause the belts 124 of the presser devices to move the sheets onto the pile and against the stops by frictional contact therewith.

The shaft 145 which carries the upper guide-in rollers is provided with an additional sprocket about which is trained a chain 155' which serves to transmit power to the shaft 156 upon which pulleys or rollers 157 are carried which drive the tapes 158 which constitute the discard conveyor I. The opposite ends of these tapes are trained about pulleys or rollers carried by the shaft 159.

Shaft 145 carries still another sprocket wheel 160 about which a chain 161 is trained, the opposite end of said chain passing around a sprocket 162 on shaft 12.

The back stops 140 for determining the positions of the piles or stacks upon the respective conveyors G and H comprise transversely extending plates secured adjacent each end to the depending brackets 165 which have hooked upper portions 166 adapted to embrace a projecting edge of a rack 167. Teeth 168 are provided in the lower edge of each of the racks and are adapted to mesh with teeth of the pinion 169 carried by each of the brackets 165. By the manipulation of hand cranks 169', applied to the shafts of the pinions 169, the back stops 140 may be quickly and accurately adjusted to any desired position along the conveyors G and H, depending upon the size of the sheet being stacked. The positions indicated in Figure 4 of the drawings are appropriate to substantially minimum lengths of stock, since the back stop 140 is disposed close to the ends of the presser frames 120. For longer sheets, obviously the back stops 140 will be moved toward the right-hand end of the frame F up to the capacity of the machine.

The means for alternately raising and lowering the delivery conveyor J will now be described. This conveyor comprises side bars 170 pivoted upon the rotary end shaft 171 which is carried by brackets 172 mounted upon the posts 173, which are rigid parts of the framework along with the extension 174 associated with the frame F of the stacker. The opposite ends of the side bars 170 are adapted to rotatably receive the transverse shaft 175, and both of the shafts 171 and 175 carry pulleys 176 about which the tapes or belts 177 are trained. The shaft 171 carries two sprocket wheels 180 and 181. As indicated in Figures 2, 3, and 7 of the drawings, the lower transverse pulley shaft of the conveyor G adjacent the delivery conveyor J is designated 107G and the upper shaft of the conveyor H is designated 107H. Upon the shaft 107G there are mounted two slip clutches 185 and 186. A drive chain 187 connects a sprocket on the upper shaft 107H to the slip clutch 186, and the slip clutch 185 is adapted to be driven directly from the lower shaft 107G. A drive chain 188 connects the slip clutch 186 with the sprocket 181 on the conveyor shaft 171 and a drive chain 189 connects the slip clutch 185 with the sprocket 180 on the shaft 171. By this arrangement, the drive shaft 171 of the delivery conveyor J is alternately actuated in accordance with the speed of the conveyors G and H from which it is receiving piles of sheets. If conveyor H is idle and the delivery conveyor J is in its full-line position as shown in Figure 3, where it is receiving piles from the lower conveyor G, it is being driven from shaft 107G through the clutch 185, the chain 189, and the sprocket 180, while the clutch 186 is slipping. When the stack conveyor H is in operation and conveyor G is idle, the delivery conveyor J occupies the upper dotted line position and is receiving sheets from conveyor H. Under these conditions, the clutch 185 is slipping and the tapes of conveyor J are being driven from shaft 107H through chain 188.

In order to alternately shift the delivery conveyor J to and from its upper and lower positions the following mechanism is provided. Each of the side bars 170 of the conveyor J is connected by means of the links or pitmans 190 to crank disks 191 carried upon the ends of the parallel shafts 192 which rotate in the bearings 193 carried by the posts 100 of the frame F. The two shafts 192 are connected together for uniform rotation by the drive chain 195 which is trained around sprockets 196 carried by the respective shafts. A second pulley 198 is fixed upon the left-hand shaft 192 as seen in Figure 4, and this pulley is connected by means of the chain 199 to the sprocket 200 fixed to the drive shaft 10. By this means it is insured that the delivery conveyor J will be operated in exact synchronism with the distributing conveyor D but in opposite phase; that is, when the distributing conveyor D is raised to feed sheets to a stack on the upper stack conveyor H,, the delivery conveyor J will be in its lower position to receive completed stacks from the lower stack conveyor G, and so on.

In Figures 13–17 inclusive, of the drawings, there is illustrated an embodiment of the invention in which the timing of the shift of the distributing conveyor in order to determine the number of sheets in a stack, is accomplished not by a change speed gear such as the one illustrated at 70 in the earlier described embodiment, but is controlled by the successive passage of the sheets themselves off of the conveyor, although the means for alternately shifting the power from one of the stack-offtake conveyors G or H may be the same as in the previously described embodiment which included the mercoid switch 115.

In Figure 13, the distributing conveyor is indicated by the reference character D' and comprises the rigid frame 80' which is pivoted upon the rotatable cross shaft 12' for vertical swinging movement, just as in the case of the corresponding structure D in the first embodiment. In describing this modification, wherever practicable, the same reference characters will be applied to elements corresponding to certain of those in the other embodiments, but with the addition of a prime.

In this embodiment, the conveyor frame 80' is not connected directly to the shifting mechanism, but is carried by a cradle 210 having side bars 211 pivoted to the shaft 12' and underlying the side bars 80' of the conveyor proper. The side bars 80' rest within the sockets 212 formed in the side bars 211 and the conveyor frame 80' partakes of all movements of the cradle 210 during normal feeding of the sheets, but may be separated therefrom when it is necessary to raise the conveyor D' to the uppermost position for discarding defective sheets upon the conveyor I. When this becomes necessary, the operator swings the handle 14' rearwardly, and thus rotates the crank shaft 13' to which is keyed a cam 213 which works in a slot 214 within the end portion of the side bar 211 of the cradle. When the hand lever 14' is swung rearwardly, the cam 213 rises beneath the side bars 80' and lifts the frame of the conveyor D' to the upper discard position.

During normal operation, the cradle 210, and consequently the conveyor D', is raised and lowered by means of the links 92' which are pivoted at their lower ends to the crank gears 75' which are mounted on the cross shaft 10'. The gears 75' are in mesh with the gears 72' which are carried by the shaft 8' and are of half the size of the gears 75'. The shaft 8' carries the single revolution clutch 5', which clutch embodies a freely rotatable sprocket 215 which is connected by means of the chain 73' to the sprocket 74' fixed upon the drive shaft 35'. The drive shaft is in continuous rotation and thus the gear 215 associated with the clutch 5' also rotates continuously. The clutch, however, transmits this rotation to the shaft 8' only when it is tripped, and then provision is made for the shaft 8 to make but a single complete revolution until the clutch is tripped again. During one revolution of the shaft 8', the shaft 10' makes a half revolution, thus either raising or lowering the cradle 250 and the conveyor D' to and from its alternate normal delivery positions.

The clutch 5' comprises a spiral cam surface having a shoulder 216 against which a trip arm 7' bears under the influence of the spring 217. The trip lever 7' is pivoted to a portion of the supporting framework E', as at 31. The lever 7' includes a tripping arm or extension 219 and also a hand lever 4' for normal actuation, as occasion demands. The tripping end 219 of the lever 7A' is disposed in the circular path of rotation of the trigger arm 6' which is keyed upon the stub shaft 76' which is supported in the bearings 220 carried by suitable framework associated with the supports E'. Also keyed upon the shaft 76' is the ratchet wheel 225, which in this example is provided with thirty-two teeth. The ratchet wheel is adapted to be given a step-by-step forward movement in a counter-clockwise direction as viewed in Figure 13, by means of the pawl 227 which is pivotally carried by the swinging lever 228 mounted for rocking movement on the shaft 76'. The lower end of the lever 228 is adapted to be actuated by the rod 229 which is an extension of the core 230 of the solenoid 232. The solenoid may be carried by any suitable framework or bracket 233 associated with a post 100' of the stacking unit of the machine. The core 230 is provided with a shoulder 234 and a coil spring 235 is compressed between the shoulder and the solenoid, whereby the lever 228 and the pawl 227 will be retracted during the time that the solenoid 232 is not energized.

A blocking-out shield or cam 240 is pivoted on the shaft 76', this shield being provided with an arcuate edge surface 241 which is of a slightly greater radius than the ratchet wheel 225. It will be seen from Figures 13, 14, and 16 that the pawl 227 is of sufficient width to overlap both the ratchet wheel 225 and the block-out cam 240, and it will thus be seen that the cam may be manipulated and adjusted by means of the handle or lever 245, so as to render the pawl 227 ineffective to engage more than a predetermined number of teeth on the ratchet wheel. A series of holes or recesses 246 are formed in the plate or bracket 233 across the face of which the adjusting handle 245 moves, and the handle may be fixed in selected positions for the insertion of a pen 247 through a hole in the handle 245 and into the selected hole 246 of the bracket.

Normally, with the cam plate 240 in the position shown in Figure 13, the pawl 227 will engage a tooth in the ratchet wheel during its fully retracted position, and upon actuation by the solenoid will move the ratchet wheel through a distance equal to the length of four teeth.

A bracket 250 is secured to each of the side bars 80' of the distributing conveyor D' and a cross shaft 251 rigidly carried by these brackets. A forwardly extending laterally adjustable and rotatable arm 252 is fixed in a selected position upon the shaft 251 by means of the set screw 253. An electrical switch 255 is capable of being set at predetermined points along the rod 252 by means of the set screw 256, and depending from the switch 255 is a switch actuating feeler or trip finger 260. This feeler is so disposed with respect to the plane of the sheets S which are severed from the web W, that it will ride upon the sheets as they are passing but will fall between the gaps formed between the sheets as the sheets are speeded up after being cut from the web. The wiring arrangement is such that the solenoid is energized whenever the switch arm drops during intervals between the sheets, the switch being open while a sheet is passing under it. Thus it will be seen that the ratchet wheel will be stepped forwardly a predetermined distance for each sheet delivered, and it will be readily understood that when the pawl 227 moves the wheel a distance of four teeth (there being thirty-two teeth in the wheel) it will take eight actuations to effect a complete rotation of the wheel 225 and the trigger arm 6'. Thus it will be seen that upon the passage of eight sheets, the trigger 6' will trip the clutch holding lever 7' and the single revolution clutch 5' will permit a half revolution of the crank gear 75' and the conveyor D' will be moved from one of its distributing positions to the other.

With the control arm 245 of the pawl blocking cam plate 240, disposed in one of the other positions 246, the pawl 227 will be effective in moving past only two teeth during its retractive movement, and will therefore step the ratchet wheel forwardly for a distance of two teeth. This means that it will take sixteen actuations before the clutch is tripped again, and therefore each stack will contain sixteen sheets. Similarly when the cam plate is adjusted to its extreme position whereby it permits the pawl 227 to move the ratchet wheel through a distance of only one tooth, each pile will contain thirty-two sheets.

Obviously, when the handle 14' is moved to throw the distributing conveyor into its uppermost or discarding position the discarded sheet should not be counted toward the formation of a stack. Therefore, provision is made for breaking the solenoid energizing circuit whenever the conveyor D' is thrown to its discard position. This purpose is accomplished by means of the switch 265 which is carried by the cradle 210 and is provided with a plunger or button 266 adapted to be held in switch closing position in the normal position of conveyor D' with respect to the cradle. Upon raising the conveyor to discard position, the pressure on the button 266 is released and the switch is opened. All of this is clearly indicated in the wiring diagram shown in Figure 17. A suitable source of current is indicated at 270 and a main control switch 271 serves to connect and disconnect the circuit with this source. The sheet controlling switch 255 is clearly indicated in the circuit together with its actuator 260. In series with this switch is the throw-out switch 265 actuated upon raising the conveyor D' to discarding position. The solenoid winding 232 is in series with these switches and it will be clearly seen how the solenoid is energized when the sheet controlled actuator 260 is in its power position between successive sheets, and deenergized when the feeler 260 rides upon a passing sheet. A manually operable switch 275 is placed in shunt across the other two switches so that whenever desired, the solenoid may be actuated regardless of positions of the switches 255 and 265.

In Figures 18-24 of the drawings there is illustrated an alternative electrically actuated pile or stack control, which is capable of providing a greater variety of stack sizes. In this embodiment the shaft 8' with its clutch 5' will be recognized and it will also be seen that the latch trip member 7' is rotatably mounted on a stub shaft 3' as in the earlier described embodiment. Also the tripping extensions 7A' projects from the lever 7' into the path of the trigger or tripping arm 6'.

Upon the shaft 76', in this embodiment, there are mounted two ratchet wheels 280 and 281, these wheels being rigidly secured together by means of the bolts 282 which pass through the wheels near the center thereof, and also through the spacing block or hub 283. The clutch trip or trigger arm 6' is also rigid with the ratchet wheels and spaced from the wheels 281 by means of the disk 284.

Freely rotatable upon the shaft 76' is the hub 285 which carries the crank arm 286 upon which two pawl members 287 and 288 are pivoted as by means of the pin 289. The rear ends of the pawls 287 and 288 are connected by means of the coil springs 290 with a pin 291 fixed at the end of the crank arm or rocking arm 286. Extending at approximately right angles with the arm 286 is an integral lever arm 293 to which the link 295 is pivotally attached. This link is connected to the solenoid core 296 which enters the solenoid 297.

In order to block out the pawls from certain predetermined numbers of teeth in the ratchet wheels 280 and 281 there are provided the cam plates 300 and 301, these plates being rigidly secured together and centered for rotatable adjustment upon the hub 283. An arm 302 extends from one of these plates, for example the plate 300, and is adjustable along the scale or dial 304. The dial 304 is provided with openings 310, 311, 312, 313, 314, and 315. These openings provide stop points for the control arm 302 and are adapted to receive the pin 317 which is carried by said arm.

In this illustrative embodiment of the invention, the ratchet wheel 280 contains thirty-two teeth and the wheel 300 which controls the engagement of the pawl 287 with the ratchet wheel 280 has a cutaway portion 320 which is of a length equal to about four teeth on the wheel 280. Similarly, the shield or cam disk 301 is cut out as at 321 to provide a gap substantially the length of four teeth of the wheel 281. As shown in Figure 18 of the drawings, the cut-out portions 320 and 321 are spaced apart around the axis of movement of these elements about the distance equal to the length of the respective cut-outs. The operation of this embodiment of the invention will now be described. The throw of the pawls under the influence of the solenoid 297 is equal to the distance of four teeth on the ratchet wheel 280, or six teeth on the wheel 281, and with the disk or shield control arm 302 in registry with the hole 310, as shown in Figure 18, the cut-out of disk 300 enables the pawl 287 to engage a tooth on the ratchet wheel 280 in the extreme end of its retractive movement. Therefore upon energizing the solenoid 297, the pawls will be brought forwardly and pawl 287 will immediately engage a tooth in the wheel 280 and move the wheel forwardly a distance of four teeth. At the same time the shield 301 blocks the pawl 288 from engagement with any of the teeth in the ratchet wheel 281. Therefore, in this position of adjustment, it will take eight actuations of the solenoid to cause the ratchet wheel assembly and its rigid trigger arm 6' to make a complete revolution, and consequently eight sheets will pass along the distributing conveyor onto one or the other of the piling or stacking areas before the trigger arm 6' trips the clutch actuator 7' and permits the clutch 5' to rotate the shafts 8' and 10' one revolution, and thus shift the distributing conveyor to deliver to the other piling area.

Upon movement of the adjusting arm 302 to registry with the hole 311 on the plate or dial 304, two teeth of the four lying in the range of movement of the pawl 287 will be shielded or blocked off (as indicated in Figure 21) and therefore the pawl 287 will step the ratchet wheel 280 forwardly only two teeth at a time. Therefore at this setting, it will take 16 actuations to rotate the trigger arm 6' through a complete circle, and thus there will be sixteen sheets delivered to each stack. In exactly the same way, an adjustment of the arm 302 to the point 312 on the dial 304, will cause the shield to cover three of the four available teeth on the ratchet wheel 280 and the pawl will move the wheel through the width of only one tooth upon each actuation. This will cause thirty-two sheets to be fed to a pile before the distributing conveyor D' is shifted.

When the arm 302 is moved to register with the hole 313 on the dial or plate 304, the gap or cutaway portion 320 of the disk or shield 300 will be moved completely away from the range of operation of the pawls and the cutaway 321 of the shield 301 will be brought into this range of movement. For example, as shown in Figure 23, the gap 321 exposes four teeth of the ratchet wheel 281 all within the range of movement of the pawl 288, whereupon the pawl will move the ratchet wheel forwardly a distance of four teeth and it will take twelve actuations to complete the cycle, and thus twelve sheets will be fed to the pile. Upon adjustment of the arm 302 to register with the opening 314, two teeth on the forty-eight toothed ratchet wheel 281 will be exposed for engagement by the pawl 288, whereupon twenty-four sheets will be fed before the distributer is shifted. In the same way, at the extreme right-hand adjustment of the arm 302, the pawl 288 will move the wheel 281 only one tooth upon each actuation, and there will be forty-eight sheets fed to a pile.

In the embodiment shown in Figures 13-24 inclusive, the same trip means for alternately energizing the stack conveyors G and H may be used as that illustrated in Figure 12, or any other energizing means may be employed. For example, in Figures 25-28 of the drawings, there is shown an arrangement whereby the delivery conveyor J' will feed off stacks from the stacking machine unit under the control of the stacks themselves, rather than from the distributing conveyor control at the forward end of the machine. The conveyor J' comprises the frame bars 170' connecting the rotatable end shafts 171' and 175' and the conveyor is raised and lowered by means of the pitmans 190' and the crank gears 191', which correspond in function to the crank disks 191 in the earlier described embodiments. The position of the parts shown in Figure 26 of the drawings is that for receiving stacks from the upper stacker level H, and it will be readily seen that a half revolution of the gear 191' and its cross shaft 192' will lower the conveyor to receive stacks from the level G. The crank gear 191' meshes with the pinion 350 which is keyed upon the shaft 351, this shaft being rotatable in bearings 352 on part of the framework of the machine. A single revolution clutch 353 is carried by the shaft 351 and the free part of the clutch includes a sprocket wheel 354. The sprocket wheel 354 is connected as by means of the chain 355 with a sprocket 356 on the upper shaft 357, this latter shaft being rotatable on bearings 358 on the supporting frame 359. The drive shaft 35', in this embodiment, extends to the vicinity of the short shaft 357 and has a bearing 360 on the support 359. This drive shaft is provided with a bevel gear 361 which meshes with a bevel gear 362 on the shaft 357.

The pinion or gear 350 is one-half the size of the crank gear 191 so that for each complete revolution of the gear 350, the crank gear 191' will rotate a half revolution, and accomplish a single shift of the conveyor J1.

In order to actuate this shifting mechanism a trip switch 370 is carried by the framework 170' of the conveyor J' and has a feeler or trip finger 371 extending upwardly into the path of movement of the stacks along the conveyor. As shown in Figure 28 the switch 370 is connected in series with the solenoid 372 and a suitable source of current 373. In Figure 27, it will be seen that the solenoid core 373 is extended to pass through a bracket 374 and is provided adjacent its end with a shoulder 375 which is urged toward the left-hand side of Figure 22 by means of a coil spring 376. Pivoted upon the end of the core 373 is a latch member 378 having a rigid depending arm 379. A trip arm 380 is pivoted as at 381 on the frame 359 and its free end is adapted to engage the spiral tripping element of the single revolution clutch 352 carried by the shaft 351. Upon energizing the solenoid 372, the latch 378, the hooked portion of which is in engagement with the part 383 on the arm 380, will pull the trip arm 380 out of engagement with the clutch element and free it for effecting one revolution of the shaft 351. Toward the end of the movement of the latch 378, the arm 379 will strike the stop abutment 385 and the latch 378 will be disengaged from the arm 380, and this arm will either by means of gravity or by means of a suitable spring mechanism, be returned to permit engagement with the clutch 353.

It will thus been seen that after the passage of one or more stacks which may be delivered from either stacking conveyor G or H, the switch 370 will be actuated to shift the conveyor J' from one stacking conveyor to the other.

It will be understood that various changes and alterations may be made in the embodiments of the invention illustrated and described herein without departing from the scope of the invention as defined by the following claims.

Having thus described the invention, what is claimed as new and desired to be secured by Letters Patent is:

1. A stacking machine for sheets comprising, in combination, a plurality of alternately usable stacking areas, means for feeding a succession of sheets to form piles on said stacking areas in alternation, means for automatically shifting said feeding means from one area to another after it has discharged a predetermined number of sheets onto a pile, means for discharging completed piles from said stacking areas to a common destination, and means for automatically controlling said discharging means to convey piles to said destination from a stacking area upon which a pile is not being formed.

2. A stacking machine for sheets comprising, in combination, a plurality of alternately usable stacking areas, means for feeding a succession of sheets to form piles on said stacking areas in alternation, means for automatically shifting said feeding means from one area to another after it has discharged a predetermined number of sheets onto a pile, means for delivering completed piles from said stacking areas, means for moving said piles from said areas to said delivery means, and means for automatically shifting said delivering means to receive piles from a stacking area upon which a pile is not being formed.

3. A stacking machine for sheets comprising, in combination, a plurality of alternately usable stacking areas, means for feeding a succession of sheets to form piles on said stacking areas in alternation, means for automatically shifting said feeding means at predetermined intervals from one area to another to cause it to discharge a corresponding predetermined number of sheets onto each pile, means for delivering completed piles from said stacking areas, means for moving said piles from said areas to said delivery means and means for automatically shifting said delivering means in opposite phase with said feeding means to receive piles from a stacking area upon which a pile is not being formed and means for synchronizing the shifting of the feeding and delivering means.

4. The machine as set forth in claim 2 in which the stacking areas each comprise conveyor units adapted to be actuated to forward the piles toward the delivery means and in which the said moving means includes means for intermittently driving said units in alternation with the feeding thereof by said feeding means.

5. The machine as set forth in claim 2 in which the stacking areas each comprise belt conveyor units positioned to run transversely to the direction of feed of the sheets thereon by said feeding means and adapted to be actuated to forward the piles toward the delivering means, and in which the said moving means includes means for intermittently driving said units in alternation with the feeding thereof by said feeding means.

6. A stacking machine for sheets comprising, in combination, a plurality of alternately usable stacking areas, means for feeding a succession of sheets to form piles on said stacking areas in alternation, means for automatically shifting said feeding means from one area to another after it has discharged a predetermined number of sheets onto a pile, means actuated by passing sheets for operating said shifting means after the passage of said predetermined number of sheets along said feeding means, means for delivering completed piles from said stacking areas, means for moving said piles from said areas to said delivering means and means for automatically shifting said delivering means to receive piles from a stacking area upon which a pile is not being formed, and means actuated by piles passing along the delivering means for operating the shifting means for said delivering means after the passage of one or more piles from a given area.

7. In a stacking machine for sheets, in combination, a plurality of alternately usable stacking areas, conveyor means for feeding a succession of sheets to form piles on said stacking areas in alternation, means for automatically shifting said conveyor means from one of said areas to the other upon the feeding of a predetermined number of sheets therealong while in a given feeding position, means for shifting said conveyor means to a sheet discarding position, and means for rendering the passage of a sheet along the conveyor while the latter is in sheet discarding position, ineffective toward actuating said shifting means.

8. In a stacking machine for sheets, in combination, a plurality of alternately usable stacking areas, conveyor means for feeding a succession of sheets to form piles on said stacking areas in alternation, sheet counting means associated with said conveyor means and adapted to be moved step by step by successive contact by sheets passing along the conveyor means, shifting means for moving said conveyor means from one of said areas to the other, tripping means actuated by said counting means for operating said shifting means upon the passage of a predetermined number of sheets along the conveyor means, means for shifting said conveyor means to a sheet discarding position, and means for rendering the counting means inoperative while said conveyor means is in sheet discarding position.

9. In a stacking machine for sheets, in combination, a plurality of stacking areas arranged one above the other, a feeding conveyor tiltable to a plurality of positions for distributing sheets to said areas, said areas themselves comprising conveyors selectively actuatable to move the completed piles formed thereon from the stacking point while a pile is being formed upon another of said areas, driving means for each of said stacking conveyors, and means carried by said tiltable feeding conveyor for stopping the driving means for the stacking conveyor to which the feeding conveyor is brought into position to feed.

10. In a stacking machine for sheets, in combination, a plurality of stacking areas arranged one above the other, a feeding conveyor tiltable to a plurality of positions for distributing sheets to said areas, said areas themselves comprising conveyors selectively actuatable to move the completed piles formed thereon from the stacking point while a pile is being formed upon another of said areas, driving motors for each of said stacking conveyors, and a mercoid switch carried by said tiltable feeding conveyor and connected into the energizing circuits of said motors, whereby the motor for driving the stacking conveyor to which the feeding conveyor is brought into position to feed, is de-energized.

11. In a stacking machine for sheets, in combination, alternately usable vertically spaced stacking areas, each comprising a belt conveyor, means for feeding sheets in superposed relationship to said conveyors to form piles thereon, the direction of feed being transverse to the direction of movement of said belt conveyors, stop means associated with each of said belt conveyors, means for adjusting said stop means across said conveyors according to the length of sheets being piled.

12. In a stacking machine for sheets, in combination, alternately usable vertically spaced stacking areas, each comprising a belt conveyor, means for feeding sheets in superposed relationship to said conveyors to form piles thereon, the direction of feed being transverse to the direction of movement of said belt conveyors, stop means associated with each of said belt conveyors, means for adjusting said stop means across said conveyors according to the length of sheets being piled, each of said belt conveyors comprising a plurality of belts arranged side by side, a supporting surface underlying said belts and grooved slightly near the junction of adjacent belts whereby the edge of a succeeding belt may sag slightly to avoid obstructing the first sheets fed cross-wise of said stacking conveyor.

13. In a stacking machine for sheets, in combination, a belt conveyor, means for feeding sheets to said conveyor, the direction of feed being transverse to the direction of movement of said belt conveyor, said belt conveyor comprising a plurality of belts arranged side by side, a supporting surface underlying said belts and grooved slightly near the junction of adjacent belts whereby the edge of a succeeding belt may sag slightly to avoid obstructing sheets fed cross-wide of said stacking conveyor.

14. In a stacking machine for sheets, in combination, a surface for receiving successive sheets to form a pile, means for feeding the sheets thereto from a point laterally of and somewhat above the level of said surface, top bearer means yieldably pressing on the pile being formed and beneath which bearer means the successive top sheets are fed, said bearer means comprising an inclined endless tape device for contacting the top surfaces of successive sheets and urging said sheets onto and across the pile toward registry with the far edge thereof while pressing downwardly thereon.

15. In a stacking machine for sheets, in combination, a plurality of alternately usable stacking areas, means for feeding a succession of sheets to said stacking areas in alternation to form piles thereon, said feeding means adapted to discharge the sheets onto the piles from a point laterally of and a little above the level of the tops thereof, bearer devices yieldably pressing on the top of the pile being formed and beneath which bearer devices the successive top sheets are fed, and means for alternately raising said respective bearer devices from said piles upon completion of the pile and during the time that another pile is being formed, whereby the completed pile may be readily removed from said areas.

16. In a stacking machine for sheets, in combination, a plurality of alternately usable stacking areas, means for feeding a succession of sheets to said stacking areas in alternation to form piles thereon, each of said areas comprising a conveyor alternately actuatable to move the completed piles from the machine, said feeding means adapted to discharge the sheets onto the piles from a point laterally of and a little above the level of the tops thereof, bearer devices yieldably pressing on the top of the pile being formed and beneath which bearer devices the successive top sheets are fed, and means for alternately raising said respective bearer devices from said piles to idle position upon completion of a pile and during the time that the conveyor is operating to carry off the completed pile.

17. In a stacking machine for sheets, in combination, a plurality of alternately usable stacking areas, feeding means shiftable with relation to said stacking areas for feeding a succession of sheets to said stacking areas in alternation to form piles thereon, said feeding means adapted to discharge the sheets onto the piles from a point laterally of and a little above the level of the tops thereof, bearer devices yieldably pressing on the top of the pile being formed and beneath which bearer devices the successive top sheets are fed, and means for raising the respective bearer devices from the pile on the area from which the feeding means is being shifted, whereby the completed piles may be readily removed therefrom, means operatively connecting said raising means with said feeding means whereby said raising means is actuated upon the shifting of said feeding means.

18. In a stacking machine for sheets, in combination, a plurality of alternately usable stacking areas, means for feeding a succession of sheets to said stacking areas in alternation to form piles thereon, each of said areas comprising a conveyor alternately actuatable to move the completed piles from the machine, said feeding means adapted to discharge the sheets onto the piles from a point laterally of and a little above the level of the tops thereof, bearer devices yieldably pressing on the top of the pile being formed and beneath which bearer devices the successive top sheets are fed, means for raising the respective bearer devices from the pile on the area from which the feeding means is being shifted, whereby the completed pile may be readily removed therefrom, and means operatively connecting said raising means with said feeding means, whereby said raising means is actuated upon the shifting of said feeding means, and means also actuated by the shifting of the feeding means to actuate the conveyor carrying the completed pile.

19. In a stacking machine for sheets, in combination, a plurality of alternately usable stacking areas disposed one above the other, a shiftable feeding conveyor for piling sheets on said areas, and means for shifting said feeding conveyor from one of said areas to another upon completion of a pile, a holddown and stacking assisting member associated with each of said areas and adapted to press yieldingly on the pile as it is being formed, means operatively connecting said feeding conveyor with said holddown members for moving said holddown members to inoperative position with relation to the pile just completed by said conveyor, a supplemental conveyor for carrying off defective sheets, means for shifting said feeding conveyor to deliver a defective sheet to said supplemental conveyor, and a yieldable connection in the connecting means between said feeding conveyor and said holddown to permit movement of said feeding conveyor to discard position without undue displacement of said holddown members.

20. In a sheet stacking machine or the like, in combination, alternately usable superposed stacking areas, and a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered into proximity to the respective stacking areas, a continuously operating constant speed drive member, a second drive member, an intermittently movable means for shifting said conveyor from one of its feeding positions to another, means for operatively connecting said intermittent shifting means with said second drive member for operation at predetermined intervals depending upon the desired period of feed to a given area, means for controlling the action of said connecting means at such intervals, and means interposed between said controlled means and said first named drive member for determining the length of said interval.

21. In a sheet stacking machine or the like, in combination, alternately usable superposed stacking areas, and a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered into proximity to the respective stacking areas, a continuously operating constant speed rotary drive member, an intermittently movable means for shifting said conveyor from one of its feeding positions to another, a member for operatively connecting said intermittent shifting means with said second drive member, an element for controlling the action of said connecting means at such intervals, and a change speed gear connecting said first named drive member with said controlling element for varying said interval.

22. In a sheet stacking machine or the like, in combination, alternately usable superposed stacking areas, and a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered into proximity to the respective stacking areas, a continuously operated constant speed drive member, an intermittently movable means for shifting said conveyor from one of its feeding positions to another, means operatively connecting said intermittent shifting means with said drive member, said last named means including sheet actuated devices for controlling the transmission of movement between said drive member and said intermittently operated shifting member, and means for setting said last named means for shifting actuation upon the passage of a predetermined number of sheets, in order to determine the number of sheets in the piles.

23. In a sheet stacking machine or the like, in combination, alternately usable superposed stacking areas, and a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered to proximity to the respective stacking areas, a continuously operating constant speed drive member, shifting means intermittently movable through a complete cycle of operation to shift said conveyor from one of its feeding positions to another, a clutch for connecting said shifting means to said drive member for moving the former through a single one of said cycles of movement for each actuation of the clutch, tripping means for said clutch, said tripping means continuously movable through successive cycles of operation and adapted to trip the clutch once during each of said cycles of movement of said tripping means, and an adjustable change speed gear between said drive member and said tripping means, whereby the speed of said tripping means and thus the time interval between successive actuations of the clutch and of the feeding conveyor shifting means may be controlled, and therefore the number of sheets fed to said areas during the alternate respective feeding periods determined.

24. In a sheet stacking machine or the like, in combination, means for delivering sheets in succession at a predetermined constant rate, two alternately usable superposed stacking areas, and a conveyor interposed between said delivering means and said areas for feeding said succession of sheets to said stacking areas in alternation to form piles thereon, said feeding conveyor being pivoted at its receiving end whereby its delivery end may be raised and lowered into proximity to the respective stacking areas, a continuously operating constant speed drive member synchronized with said sheet delivering means, a crank connected with said conveyor and adapted to raise or lower it from one position to the other during a half rotation of the crank, a shaft for driving said crank and rotatable through one complete revolution for each half revolution of said crank, a single-revolution clutch on said shaft and having a rotatable element driven by said drive member, a continuously revolving trip member adapted to trip said clutch to initiate movement of said shaft once during each revolution of said trip member, and an adjustable speed change gear between said drive member and said trip member, and means for setting said change speed gear to control the speed of the trip member and thus the interval of actuation of said clutch, whereby the number of sheets fed to a given stacking area is determined.

25. In a stacking machine or the like, in combination, a plurality of superposed normal delivery points for sheets, a supplemental delivery point above said delivery points as for the disposal of defective sheets, rigid conveyor means, a pivot on said machine at the receiving end of said conveyor means whereby its delivery end may be raised or lowered into proximity with said delivery points, a power operated crank having a link connection to said conveyor means, the throw of the crank permitting the shifting of the conveyor means to and from said normal delivery points, and means actuatable at will for raising the delivery end of the conveyor to said supplemental delivery point.

26. In a stacking machine or the like, in combination, a plurality of superposed normal delivery points for sheets, a supplemental delivery point above said delivery points as for the disposal of defective sheets, rigid conveyor means, a pivot on said machine at the receiving end of said conveyor means whereby its delivery end may be raised or lowered into proximity with said delivery points, a power operated crank having a link connection to said conveyor means, the throw of the crank permitting the shifting of the conveyor means to and from said normal delivery points, said link comprising one arm of a two-arm toggle, the toggle being normally broken, and manually operated means for extending said toggle and thus raising the delivery end of the conveyor to said supplemental delivery point.

27. In a stacking machine or the like, in combination, a plurality of superposed normal delivery points for sheets, a supplemental delivery point above said delivery points as for the disposal of defective sheets, pivoted conveyor means, a pivot on said machine at the receiving end of said conveyor means whereby its delivery end may be raised or lowered into proximity with said delivery points, a power operated crank having a link connection to said conveyor means, the throw of the crank permitting the shifting of the conveyor means to and from said normal delivery points, said conveyor means including a conveyor proper and a supporting cradle pivotally connected with each other and adapted to move as a unit between said normal delivery points, and means operable at will for raising the conveyor proper relative to the cradle to discharge sheets onto the supplemental delivery point.

28. In a sheet stacking machine, or the like, in combination, two alternately usable superposed stacking areas, a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered into proximity with the respective stacking areas, a continuously rotating constant speed drive member, intermittently moving shifting means for alternately tilting said conveyor to deliver a predetermined number of sheets to each stacking area, intermittently actuated connecting means between said drive member and said shifting means, and means for actuating said connecting means upon the passage of a predetermined number of sheets along said feeding conveyor, said last named means comprising the following: a revolving actuating element adapted to be brought into actuating position at predetermined points on its orbit, a ratchet wheel rotatable with said element, a pawl adapted to step the ratchet wheel about its axis of rotation, the throw of the pawl upon each movement being equal to the space occupied by a plurality of teeth in said wheel, and means actuated by the passage of the sheet for effecting a single movement of said pawl.

29. In a sheet stacking machine, or the like, in combination, two alternately usable superposed stacking areas, a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered into proximity with the respective stacking areas, a continuously rotating constant speed drive member, intermittently moving shifting means for alternately tilting said conveyor to deliver a predetermined number of sheets to each stacking area, intermittently actuated connecting means between said drive member and said shifting means, and means for actuating said connecting means upon the passage of a predetermined number of sheets along said feeding conveyor, said last named means comprising the following: a revolving actuating element adapted to be brought into actuating position at predetermined points on its orbit, a ratchet wheel rotatable with said element, a pawl adapted to step the ratchet wheel about its axis of rotation, the throw of the pawl upon each movement being equal to the space occupied by a plurality of teeth in said wheel, means actuated by the passage of the sheet for effecting a single movement of said pawl, and an adjustable shield for blocking the pawl from a predetermined number of teeth in said ratchet wheel so that said pawl will be effective in stepping the wheel a distance equal to one or more teeth and thus vary the number of actuations necessary to move the wheel and said revolving actuating element through a cycle of movement.

30. In a sheet stacking machine, or the like, in combination, two alternately usable superposed stacking areas, a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered to proximity with the respective stacking areas, a continuously rotating constant speed drive member, intermittently moving shifting means for alternately tilting said conveyor to deliver a predetermined number of sheets to each stacking area, intermittently actuated connecting means between said drive member and said shifting means, and means for actuating said connecting means upon the passage of a predetermined number of sheets along said feeding conveyor, said last named means comprising the following: a revolving actuating element adapted to be brought into actuating position at predetermined points on its orbit, a plurality of ratchet wheels disposed side by side, rotatable with said actuating element, and provided with different numbers of teeth, the number of teeth on one or another of said wheels selected as being divisible by the numbers of sheets that it is contemplated to provide in the piles to be formed upon the stacking areas, a plurality of pawls supported on a common oscillatable support, each pawl adapted to step one of the wheels about its axis a distance equal to a predetermined number of teeth, and plurality of arcuately adjustable shields each associated with a pawl, and all but one adapted to block out the remaining pawls when one of the pawls is permitted to step its wheel, and one of the shields adapted to block said operating pawl from a predetermined number of teeth in its wheel so that said pawl will be effective in stepping the wheel a distance equal to one or more teeth, and thus vary the number of actuations necessary to move the wheel and its associated revolving actuating element through one cycle of movement, and means actuated by the passage of successive sheets for oscillating said pawl carrier.

31. In a sheet stacking machine, or the like, in combination, two alternately usable superposed stacking areas, a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered to proximity with the respective stacking areas, a continuously rotating constant speed drive member, intermittently moving shifting means for alternately tilting said conveyor to deliver a predetermined number of sheets to each stacking area, intermittently actuated connecting means between said drive member and said shifting means, and means for actuating said connecting means upon the passage of a predetermined number of sheets along said feeding conveyor, said last named means comprising the following: a revolving actuating element adapted to be brought into actuating position at predetermined points on its orbit, a ratchet wheel rotatable with said element, a pawl adapted to step the ratchet wheel about its axis of rotation, the throw of the pawl upon each movement being equal to the space occupied by a plurality of teeth in said wheel, electro-magnetic means for moving said pawl, a source of electric current for energizing said electro-magnetic means, an electric circuit connecting said electro-magnetic means with the source of current, a switch in said circuit and an actuator for said switch disposed in the path of movement of said sheets along said conveyor, whereby said pawl is moved once for each passage of a sheet.

32. In a sheet stacking machine, or the like, in combination, two alternately usable superposed stacking areas, a rigid elongated conveyor for feeding a succession of sheets to said stacking areas in alternation to form piles thereon, a pivot on the machine for said feeding conveyor, said pivot disposed at the receiving end of the conveyor whereby its delivery end may be raised and lowered to proximity with the respective stacking areas, a continuously rotating constant speed drive member, intermittently moving shifting means for alternately tilting said conveyor to deliver a predetermined number of sheets to each stacking area, intermittently actuated connecting means between said drive means and said shifting means, and means for actuating said connecting means upon the passage of a predetermined number of sheets along said feeding conveyor, said last named means comprising the following: a revolving actuating element adapted to be brought into actuating position at predetermined points on its orbit, a ratchet wheel rotatable with either element, a pawl adapt d to step the ratchet wheel about its axis of rotation, the throw of the pawl upon each movement being equal to the space occupied by a plurality of teeth in said wheel, electro-magnetic means for moving said pawl, a source of electric current for energizing said electro-magnetic means, an electric circuit connecting said electro-magnetic means with the source of current, a switch in said circuit and an actuator for said switch disposed in the path of movement of said sheets along said conveyor, whereby said pawl is moved once for each passage of a sheet, means for shifting said feeding conveyor upwardly beyond the uppermost normal stacking point in order to discard defective sheets, a second switch in said electric circuit and means for opening said switch when said conveyor is moved to said discard position, whereby said electro-magnetic means may not be energized by the passage of a sheet along the conveyor while the latter is in said discard position, and thus said discarded sheets may not be counted toward the formation of a pile on the stacking areas.

33. In a stacking machine for sheets or the like, in combination, a plurality of alternately usable stacking areas, each comprising a conveyor, individual driving means for said conveyors, a distributing conveyor shiftable to feed a succession of sheets to form piles on said stacking areas in alternation, means for shifting said distributing conveyor from one area to another when a pile is of a described height, means automatically operated by the shifting of said distributing conveyor for alternately energizing said respective drive means to cause the stacking conveyors to move completed piles away from the stacking points, a pile delivery conveyor shiftable to receive completed piles from said stacking conveyors in alternation, means for automatically shifting said delivery conveyor to receive from a stacking conveyor upon which a pile is not being formed, and transmission means between the respective drive means for said stacking conveyors and said delivery conveyor, whereby the latter may be driven at a speed synchronized with the individual stacking conveyor from which it is receiving sheets.

34. In a stacking machine for sheets or the like, in combination, a pair of alternately usable stacking areas, each comprising a belt conveyor, individual driving motors for said conveyors, a distributing conveyor shiftable to feed a succession of sheets to form piles on said stacking areas in alternation, means for automatically shifting said distributing conveyor from one area to the other when a pile is of a described height, means automatically operated by the shifting of said distributing conveyor for alternately energizing said respective drive motors to cause the stacking conveyor to move completed piles away from the stacking points, a pile delivery conveyor shiftable to receive completed piles from said stacking conveyors in alternation, means for automatically shifting said delivery conveyor to receive from a stacking conveyor upon which a pile is not being formed, and slip clutches between the respective drive motors for said stacking conveyors and said delivery conveyor, whereby the latter may be driven at a speed synchronized with the individual stacking conveyor from which it is receiving sheets.

35. In a stacking machine for sheets or the like, in combination, a plurality of alternately usable stacking areas, each comprising a conveyor, individual driving means for said conveyor, a distributing conveyor shiftable to feed a succession of sheets to form piles on said stacking areas in alternation, means for shifting said distributing conveyor from one area to another, when a pile is of a described height, means automatically operated by the shifting of said distributing conveyor for alternately energizing said respective drive means to cause the stacking conveyor to move completed piles away from the stacking points, a pile delivery conveyor shiftable to receive completed piles from said stacking conveyors in alternation, means actuated by the alternate shifting of said distributing conveyor for automatically shifting said delivery conveyor to receive from a stacking conveyor upon which a pile is not being formed, and transmission means between the respective drive means for said stacking conveyors and said delivery conveyor, whereby the latter may be driven at a speed synchronized with the individual stacking conveyor from which it is receiving sheets.

36. In a stacking machine for sheets or the like, in combination, a plurality of alternately usable stacking areas, each comprising a conveyor, individual driving means for said conveyor, a distributing conveyor shiftable to feed a succession of sheets to form piles on said stacking areas in alternation, means for shifting said distributing conveyor from one area to another when a pile is of a described height, means automatically operated by the shifting of said distributing conveyor for alternately energizing said respective drive means to cause the stacking conveyor to move completed piles away from the stacking points, a pile delivery conveyor shiftable to receive completed piles from said stacking conveyors in alternation, means actuated by the passage of completed piles along the delivery conveyor for automatically shifting said delivery conveyor to receive from a stacking conveyor upon which a pile is not being formed, and transmission means between the respective drive means for said stacking conveyors and said delivery conveyor, whereby the latter may be driven at a speed synchronized with the individual stacking conveyor from which it is receiving sheets.

37. The stacking machine as set forth in claim 36 in which the means for automatically shifting said delivery conveyor comprises an electric switch arranged to be tripped by the passage of piles along the delivery conveyor, continuously operating drive means, intermittently operated shifting means for the delivery conveyor, a clutch for operatively connecting said shifting means with said continuously operating drive means, a trip for said clutch, a solenoid for actuating said trip, a source of current, and a circuit including said source of current, said solenoid, and said switch, the arrangement of said switch being such that it is in circuit-opening position during contact with passing piles on the delivery conveyor and in circuit-closing positon when no piles are passing.

38. In a sheet stacking machine, in combination, a stacking area, means for feeding a succession of sheets to said stacking area to form piles thereon, said feeding means adapted to discharge the sheets onto the piles from a point laterally of said piles and a little above the same, bearer devices yieldably pressing on the top of the pile being formed and beneath which bearer devices the successive top sheets are fed, and means for raising said bearer device from said pile to an upper idle position upon completion of a pile, and a lost-motion connection between said last named means and said bearer device, whereby said bearer device may rise freely as the pile increases and the raising means may pick up the bearer devices at any point to which it may have risen and carry it to its upper limit of movement, when said raising means is actuated.

WILMER W. WAGNER, Jr.
HENRY B. GREENWOOD.

REFERENCES CITED

The following references are of record in the file of this patent:

UNITED STATES PATENTS

| Number | Name | Date |
| --- | --- | --- |
| 815,008 | Davidson | Mar. 13, 1906 |
| 1,295,123 | Chesire | Feb. 25, 1919 |
| 1,305,501 | Steele | June 3, 1919 |
| 1,831,245 | Hitchcock | Nov. 10, 1931 |
| 1,947,396 | Jaite | Feb. 13, 1934 |
| 1,981,621 | Gurwick | Nov. 20, 1934 |
| 2,013,220 | Rosenthal | Sept. 3, 1935 |
| 2,076,391 | Whitehead | Apr. 6, 1937 |
| 2,084,741 | Price | June 22, 1937 |
| 2,367,416 | Matthews | Jan. 16, 1945 |
| 2,375,241 | Lindgren et al. | May 8, 1945 |
| 2,392,032 | Domville et al. | Jan. 1, 1946 |
| 2,414,337 | Shields | Jan. 14, 1947 |